United States Patent
Ekanayake et al.

(10) Patent No.: US 9,280,797 B2
(45) Date of Patent: Mar. 8, 2016

(54) SYSTEM AND METHOD TO MINIMIZE GRID SPINNING RESERVE LOSSES BY PRE-EMPTIVELY SEQUENCING POWER GENERATION EQUIPMENT TO OFFSET SOLAR GENERATION CAPACITY BASED ON GEOSPATIAL REGIONAL SOLAR AND CLOUD CONDITIONS

(71) Applicant: General Electric Company, Schenectady, NY (US)

(72) Inventors: Sanji Ekanayake, Mableton, GA (US); Alston Ilford Scipio, Mableton, GA (US); Dale J. Davis, Greenville, SC (US); Eric J. Kauffman, Marietta, GA (US); Timothy Tah-teh Yang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 14/031,242

(22) Filed: Sep. 19, 2013

(65) Prior Publication Data
US 2015/0081124 A1    Mar. 19, 2015

(51) Int. Cl.
  F03B 13/00    (2006.01)
  F03B 13/10    (2006.01)
  H02P 9/04     (2006.01)
  G06Q 50/06    (2012.01)
  G05D 3/12     (2006.01)
  G05D 5/00     (2006.01)

(52) U.S. Cl.
  CPC ..................... *G06Q 50/06* (2013.01)

(58) Field of Classification Search
  USPC ............................. 290/43; 700/286, 287, 295
  See application file for complete search history.

(56) References Cited

U.S. PATENT DOCUMENTS

| | | | | |
|---|---|---|---|---|
| 6,479,907 B1 * | 11/2002 | Eriksson | ................. | F03D 9/002 290/42 |
| 7,142,949 B2 * | 11/2006 | Brewster | ................. | G06Q 10/06 700/286 |
| 7,149,605 B2 * | 12/2006 | Chassin | .................... | H02J 3/14 700/286 |
| 7,236,896 B2 * | 6/2007 | Farkas | ....................... | H02J 3/14 702/60 |
| 7,333,880 B2 * | 2/2008 | Brewster | ................. | G06Q 10/00 700/22 |
| 8,340,832 B1 * | 12/2012 | Nacke | ........................ | H02J 3/14 700/286 |
| 8,588,989 B1 * | 11/2013 | Heath | ....................... | G06F 1/26 700/286 |
| 8,718,832 B2 * | 5/2014 | Hashimoto | ........... | F03D 7/0284 290/44 |
| 8,886,477 B2 * | 11/2014 | Imahara | .................... | H02J 3/00 702/61 |
| 8,963,353 B1 * | 2/2015 | Ekanayake | ........... | F03D 7/0284 290/43 |
| 2009/0240381 A1 * | 9/2009 | Lane | ......................... | H02J 3/14 700/296 |

(Continued)

FOREIGN PATENT DOCUMENTS

WO    WO 2011/150319    12/2011

OTHER PUBLICATIONS

U.S. Appl. No. 14/031,212, filed Sep. 19, 2013, Ekanayake.

*Primary Examiner* — Pedro J Cuevas
(74) *Attorney, Agent, or Firm* — Ernest G. Cusick; Frank A. Landgraff (57) ABSTRACT

A system and method to preemptively adjust power generation of one or more non-solar power generators based on near term solar generation capability, spinning reserve margin, and/or power grid spinning reserve forecast requirements to offset solar power generation based on geospatial regional solar conditions.

20 Claims, 3 Drawing Sheets

(56) References Cited

U.S. PATENT DOCUMENTS

| | | | |
|---|---|---|---|
| 2010/0198420 A1* | 8/2010 | Rettger | G01W 1/10 700/291 |
| 2011/0046803 A1* | 2/2011 | Kondo | F03D 7/0272 700/287 |
| 2011/0106321 A1 | 5/2011 | Cherian et al. | |
| 2011/0144816 A1* | 6/2011 | Morjaria | F03D 7/0276 700/287 |
| 2012/0290104 A1 | 11/2012 | Holt et al. | |
| 2012/0310434 A1 | 12/2012 | Taft | |
| 2012/0310435 A1 | 12/2012 | Taft | |
| 2012/0330549 A1 | 12/2012 | Dannevik | |
| 2013/0013121 A1* | 1/2013 | Henze | G06Q 10/04 700/291 |
| 2013/0345884 A1* | 12/2013 | Forbes, Jr. | G05B 15/02 700/286 |
| 2013/0345888 A1* | 12/2013 | Forbes, Jr. | H02J 3/14 700/291 |
| 2014/0018969 A1* | 1/2014 | Forbes, Jr. | H02J 3/32 700/295 |
| 2014/0077597 A1* | 3/2014 | Nishibayashi | H02J 4/00 307/31 |
| 2015/0076821 A1* | 3/2015 | Ekanayake | F03D 7/0284 290/43 |
| 2015/0100172 A1* | 4/2015 | Forbes, Jr. | H02J 3/32 700/295 |
| 2015/0155713 A1* | 6/2015 | Forbes, Jr. | G05B 15/02 700/286 |

* cited by examiner

SYSTEM AND METHOD TO MINIMIZE GRID SPINNING RESERVE LOSSES BY PRE-EMPTIVELY SEQUENCING POWER GENERATION EQUIPMENT TO OFFSET SOLAR GENERATION CAPACITY BASED ON GEOSPATIAL REGIONAL SOLAR AND CLOUD CONDITIONS

TECHNICAL FIELD

The subject matter disclosed herein relates to methods and systems for power generation, and more particularly to electric power grids connected to both solar power generation systems and other non-solar power generation systems, such as gas turbine power generators.

BACKGROUND OF THE INVENTION

A power grid distributes power by generating electricity at a power generation facility, and then distributing the electricity through a variety of power transmission lines to the power consumer. The power generator in many, if not most, cases consists of one or more spinning electrical generators. Sometimes the spinning generators are driven by a hydroelectric dam, large diesel engines or gas turbines; in many cases the generators are powered by steam.

When the power generator is a so-called spinning electrical generator, i.e., a gas or steam turbine generator, it typically does not operate at peak, i.e., 100% capacity, rather operates, under normal conditions, with a spinning reserve margin, which is the extra generating capacity that is available by increasing the power output of generators that are online, i.e., already running and connected to the electric power generation facility. For most power generators, this increase in power is achieved by increasing the torque applied to the turbine's rotor, for example, by increasing the gas or steam flow or pressure to the turbine. Maintaining a spinning reserve is important to efficient and timely power generation, as increased power demands can be met virtually in real time by employing the spinning reserve capacity. This is in contrast with non-spinning reserve, i.e., extra power generating capacity that is not currently running or connected to the system, which typically can only be brought online with some delay.

Due to the need to have sufficient grid spinning reserve to accommodate, for example, peak demand load requirements, and avoid power disruptions, brownouts, blackouts, etc., grid spinning reserves tend to be maintained at relatively conservative levels, for example, by running numerous gas turbines but maintaining each at a run rate sufficiently below capacity to allow for near instantaneous increased power generation in response to increased demand. Because a spinning electrical generator tends to operate at higher efficiency as it approaches 100% capacity, running below capacity tends to result in inefficiencies, known as grid spinning reserve losses. Accordingly, it would be desirable to minimize grid spinning reserve losses by reducing the reserve margin requirement, while maintaining sufficient spinning reserve to meet anticipated peak loads.

BRIEF DESCRIPTION OF THE INVENTION

According to an embodiment of the disclosure, an electric power system comprising an electric power grid comprising one or more non-solar power generators is disclosed. The electric power grid may be configured to determine a spinning reserve margin for the one or more non-solar power generators, and to determine at least one atmospheric or environmental factor influencing solar generation capability for a region associated with the electric power grid. The electric power grid may be further configured to determine, based on the at least one atmospheric or environmental factor, near term solar generation capability of a solar power generation system connected to the electric power grid. The electric power grid may be further configured to determine a power grid spinning reserve forecast requirement, and to receive, initiate, and/or transmit instructions to adjust power generation of the one or more non-solar power generators based on the near term solar generation capability and the power grid spinning reserve forecast requirement.

In another aspect of the disclosure, a method is disclosed that may comprise determining a spinning reserve margin for an online electric power grid served by one or more power generators; determining at least one atmospheric or environmental factor influencing solar generation capability for a region associated with the online electric power grid; determining, based on the at least one atmospheric or environmental factor, near term solar generation capability of a solar power generation system connected to the online electric power grid; determining a power grid spinning reserve forecast requirement; and providing instructions to adjust power generation of the one or more non-solar power generators based on the near term solar generation capability and the power grid spinning reserve forecast requirement.

In yet another aspect of the disclosure, a method is disclosed that may comprise determining a power price spark spread for power being produced by one or more non-solar power generators associated with an electric power grid; determining near term solar generation capability of a solar power generation system connected to the online electric power grid; and determining, based on the power price spark spread and the near term solar generation capability, whether to adjust power generation of the one or more non-solar power generators.

DETAILED DESCRIPTION OF THE INVENTION

Figure 1:
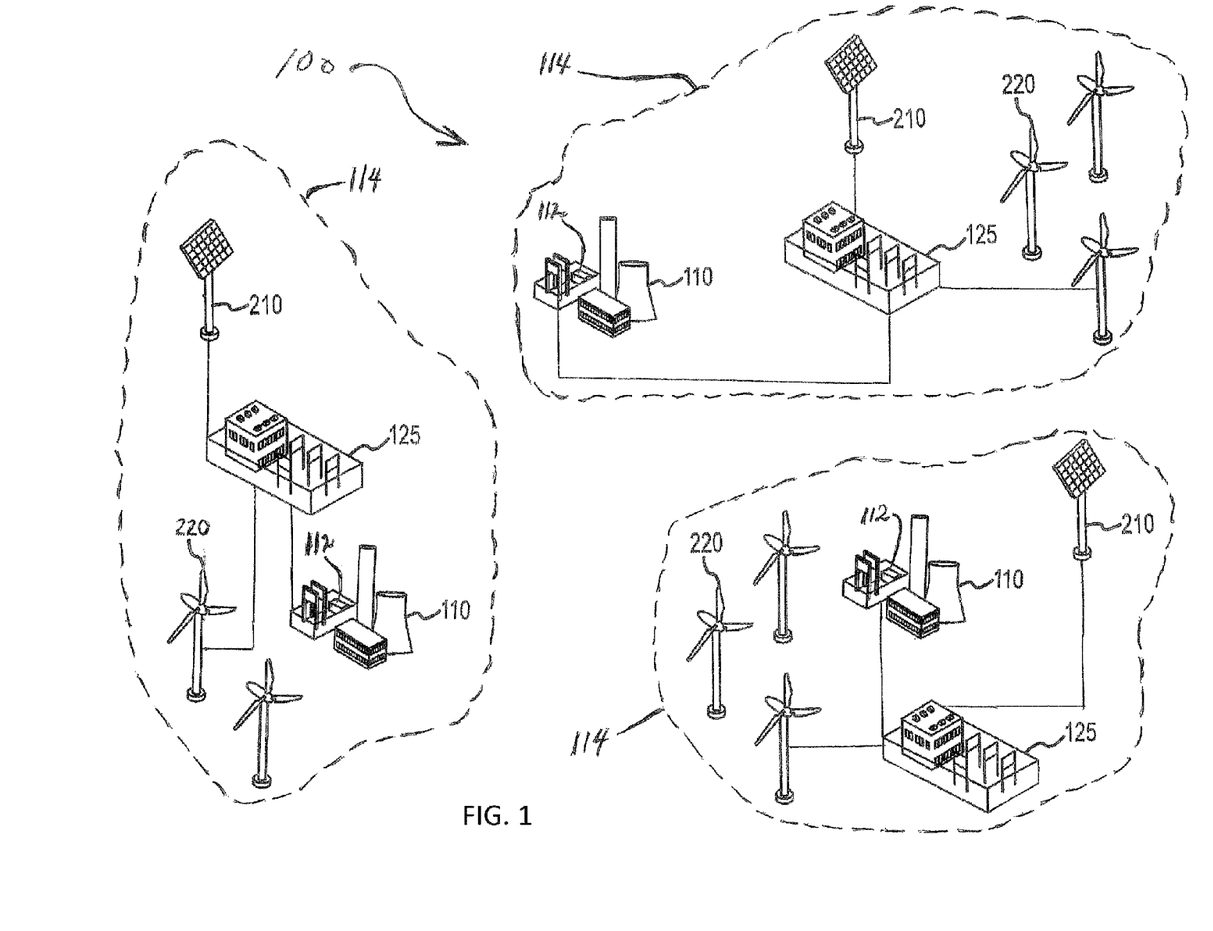
FIG. 1 is an exemplary electrical power distribution grid of an embodiment of the disclosure.

FIG. 1 illustrates a high level distributed electrical power grid, generally 100, according to an embodiment of the disclosure. As there illustrated, one or more traditional electric power generation facilities 110 in the electrical power grid 100 may be coupled to substations 125 and solar arrays 210 and/or wind turbine farms 220. Although FIG. 1 illustrates three forms of power generation, one of ordinary skill in the art will recognize that the present disclosure is applicable to any form of power generation or energy source.

Each electric power generation facility 110 may comprise one or more non-solar power generators, 112. The non-solar power generators 112 may be any one of, or any combination of, for example, gas turbine generators, steam turbine generators, battery packs, and capacitor banks, or any other type of non-wind power generator. Each non-solar power generator 112 may be connected to the electrical power grid 100 served by the electric power generation facility 110, and controlled using control modules suitable for the purpose. Power production may be controlled at the grid level in order to meet load demand by sending a load request signal to increase or decrease power production to individual power generators. The grid may also issue a remote start-up or shut-down signal to the power generation unit. Modern grids control both load ramp and unit start-up/shut-down automatically based on pre-programmed control logic including reserve margins. Legacy grids controlled some or all aspects of this manually via telephone calls to the power generation plant/facility operating personnel. Each power generation unit may include a dedicated control system to manage unit operation in similar fashion to modern automotive engine controllers. An example power generation unit control system manufactured by General Electric Company is the Speedtronic Mark-VI power generation unit control system. In addition to integrated unit control systems, alternate control systems may include Distributed Control Systems (DCS) and Programmable Logic Controllers (PLC).

When the non-solar power generator 112 is a so-called spinning electrical generator, i.e., a gas or steam turbine generator, it typically does not operate at peak, i.e., 100% capacity, rather operates, under normal conditions, with a spinning reserve margin, which is the extra generating capacity that is available by increasing the power output of generators that are already connected to the power system, i.e., an electric power generation facility 110. For most non-solar power generators 112, this increase in power is achieved by increasing the torque applied to the turbine's rotor. Maintaining a spinning reserve is important to efficient and timely power generation, as increased power demands can be met in virtually real time by employing the spinning reserve capacity. This is in contrast with non-spinning reserve, i.e., extra power generating capacity that is not currently connected to the system, which typically can only be brought online with some delay.

According to an embodiment of the disclosure, the electric power generation facility 110 and/or electrical power grid 100 may be configured to determine the spinning reserve margin for each of the non-solar power generators 112. For example, an electrical power grid 100 or electric power generation facility 110 may determine, based on historical experience and/or data, that a power reserve margin of 5% should be maintained at a particular time of day. This power reserve margin may be determined, for example, based on historically known peak load times of day, times of the year, temperature data, etc. To use a simplistic example, if the electric power generation facility 110 had two identical gas turbine generators, it could maintain a 5% spinning reserve margin by running both gas turbine generators at 95% capacity, or by running one generator at 100% capacity and the other at 90% capacity. Other combinations are of course possible in electric power generation facilities that employ numerous types of power generation equipment to maintain their preferred spinning reserve margin.

According to an embodiment of the disclosure, the electrical power grid 100 or electric power generation facility 110 may be further configured to determine, or to access information concerning, at least one atmospheric or environmental factor influencing solar generation capability for a region 114 in which a solar array 210 associated with and/or connected to the electrical power grid 100 or power generation facility 110 resides. Such atmospheric or environmental factor may include one or more of, for example, solar intensity, solar duration, cloud cover, air clarity, airborne particulate data, time of day, ambient temperature, water vapor content, aerosol size distribution, etc. Such factor(s) may be used to determine the near term solar generation capability of each solar array 210 connected to the electrical power grid 100 or electric power generation facility 110. Anticipated solar power generation capacity for a particular region 114 may be derived from GIS regional solar and cloud-cover conditions together with operation and maintenance factors. Sources of geospatial environmental and atmospheric data include NASA satellite data feeds, private satellite data feeds, Google maps, NOA data feeds, weather channel links, private sensor arrays, etc. Unit operational factors and maintenance factors are typically accumulated at the unit controller level and aggregate data is available at the OEM data systems level, for example General Electric Company Monitoring & Diagnostics systems.

The electrical power grid 100 or electric power generation facility 110 may further be configured to determine a power reserve spinning forecast requirement. For example, if the non-solar power generators 112 of an electric power generation facility 110 normally operates at 50% capacity at midnight in a particular region 114, then its spinning reserve margin at midnight is 50%. But at noon in the summer, the same facility may know that, based on historical data, it will experience peak load demands and need to operate, for example, at 95% capacity, leaving a 5% spinning reserve margin at noon. Thus, in this example, the electric power generation facility 110 may be configured to determine at midnight a power grid spinning reserve forecast requirement of an additional 45% capacity needed to meet demands at noon in the summer.

The electrical power grid 100 or electric power facility 110 may be further configured to receive, initiate, and/or transmit instructions to adjust power generation of the one or more non-solar power generators 112 based on one or more of the near term solar generation capability, the non-solar power generator contributions to the spinning reserve for the power grid, and/or the power grid spinning reserve forecast requirement. Such instructions may comprise a signal, and may be transmitted through wired communications or through wireless networks. Information for providing such instructions may be obtained from global climate monitoring satellites, for example, and may be based on monthly or yearly averages and lower atmospheric measurements. As used herein, the term "adjust" may mean increasing power generation, decreasing power generation, initiating power generation of an idle power generator, and/or shutting down power generation of the one or more power generators.

If the region 114 in which the solar arrays 210 are situated is expected to experience heavy cloud cover at noon, for example, then, according to an embodiment of the disclosure, the electric power facility 110 may be configured to anticipate and/or be apprised of such cloud cover in real time. If, in this example, the noon cloud cover reduces the solar array's contribution to the capacity of the electrical power grid by 5%, this 5% lost capacity may be made up for in real time by relying on the spinning reserve and adjusting the non-solar power generators 112, i.e., by increasing their output to match the loss of solar power. On the other hand, if demand for power at a given time drops, and if it is more economical for the electrical power grid 100 or electric power facility 110 to employ solar power, then, according to an embodiment of the disclosure, the non-solar power generators 112 may be adjusted to decrease their power output with the system relying more heavily on the solar power contributions of the solar arrays 210.

The electrical power grid 100 or power generation facility 110 may thus be configured to adjust the power generation of the one or more non-solar power generators 112 by decreasing that power generation in response to a determination of increased near term solar generation capability, and may be further configured to adjust the power generation of the one or more non-solar power generators 112 by increasing that power generation in response to a determination of decreased near term solar generation capability.

According to another embodiment of the disclosure, the systems and/or methods described herein may be employed to decrease power output or shut down non-solar power generators 112 in advance of a drop in power price spark spread, for example, due to an increase in solar capability. "Spark spread" is a monetary difference between the cost of production of a commodity, such as energy, and the current market price. Because spark spread varies instantaneously, it may be advantageous to employ the systems and methods of the disclosure in order to maximize spark spread at any given moment in time, based on the real time information being received.

According to another embodiment of the disclosure, the electrical power grid 100 or electric power generation facility 110 may be configured to adjust power generation of the non-solar power generators 112 based on one or more of the near term solar generation capability, non-solar power generator contributions to the spinning reserve, and/or the spinning reserve forecast requirement. The spinning reserve forecast requirement may be determined by determining a change in power consumption demand based on historical power consumption patterns.

According to another embodiment of the disclosure, the electrical power grid 100 may serve a plurality of regions 114 in which solar arrays 210 reside. According to this embodiment, each region 114 may be served by at least one solar power generating system, such as a solar array 210, and at least one electric power generation facility 110. Other combinations are of course possible. In this embodiment, the electrical power grid 100 may be configured to simultaneously adjust one or more non-solar power generators 112 in each region 114 based on near term solar power generation capability and the power generating facility spinning forecast requirement for each region.

Figure 2:
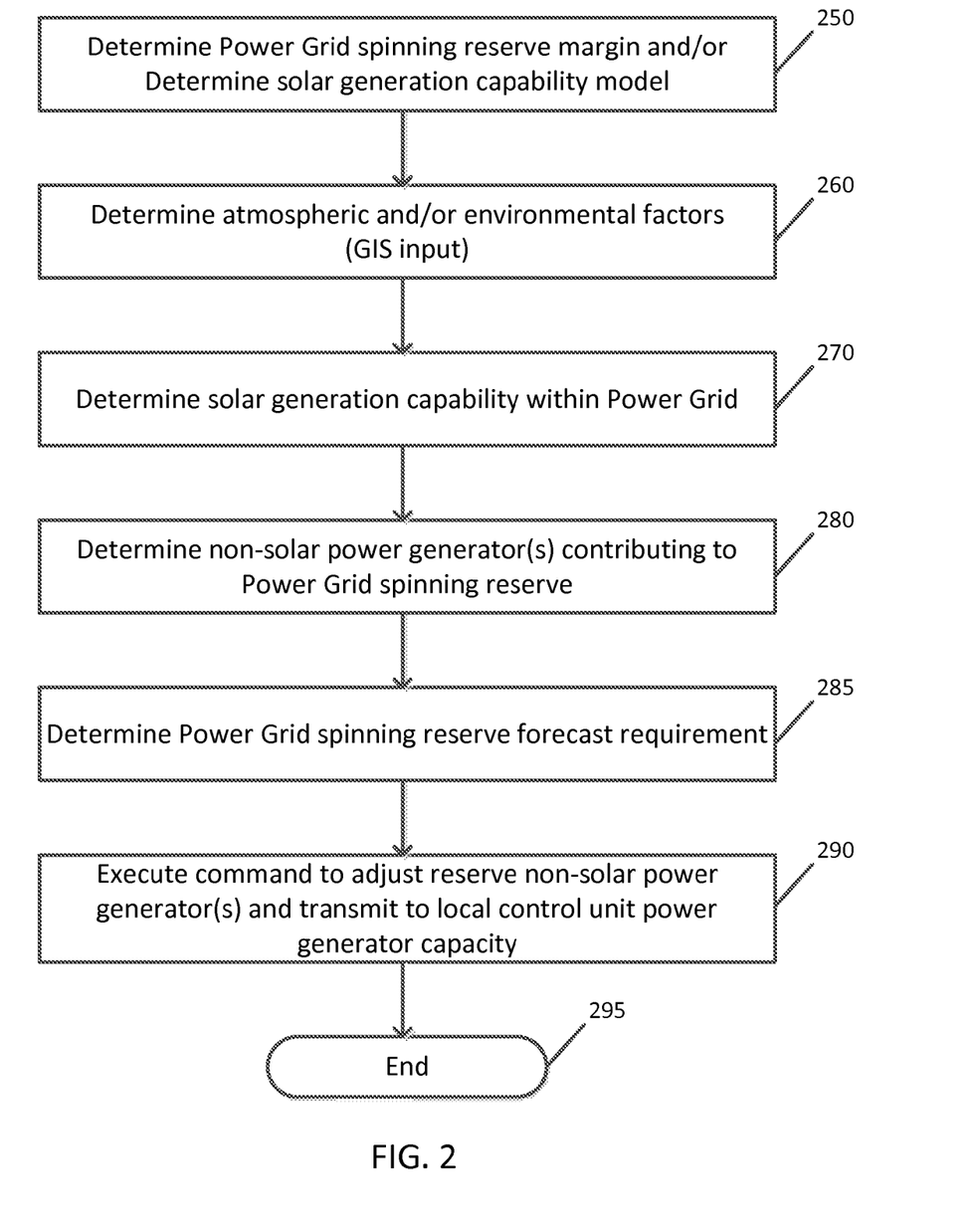
FIG. 2 is an exemplary flow diagram illustrating a method of practicing an embodiment of the disclosure.

FIG. 2 illustrates a flow diagram for a method of practicing an embodiment of the disclosure. According to a method there illustrated, at operation 250, a spinning reserve margin, for example, for an online electrical power grid 100 served by one or more non-solar power generators 112, may be determined as set forth herein. A solar generation capability model may also be determined, which model may be used to determine solar generation capability of a particular region 114 within the electrical power grid 100 at a particular time. This capability model may be bounded by parameters such as the maximum design capability of the solar generating units, the sunlight intensity required to produce this design capability, the percent relative cloud cover, scheduled and un-scheduled maintenance due, etc.

At operation 260, one or more atmospheric and/or environmental factors, such as those previously described (GIS i.e., Geospatial Information System input), influencing solar generation capability for a region 114 associated with the online electric power grid may be determined. In the United States, regions are divided by ISO into five regions, which generally also include sub-regions having boundaries defined by major utilities. As used herein, a region 114 may be one of the five ISO regions, one of the sub-regions, or any other generally recognized geographic region for electrical power generation.

At least one of the atmospheric or environmental factors determined at operation 260 for a region 114 of interest may be used at operation 270 to determine near term solar generation capability of a solar power generation system, such as solar arrays 210 within the electrical power grid 100 and/or connected thereto. For example, if at operation 260, it is determined that the region 114 of interest is experiencing cloud cover diminishing solar intensity by 50%, then, assuming no other variables or factors are present, operation 270 may determine that such cloud cover would result in 50% of maximum solar power generation capability within the region in the near term. As used herein, the phrase "near term" is intended to refer to conditions approximating instantaneous current conditions, including actual current conditions, as well as recent conditions, i.e., within the past hour or less, and predicted conditions, i.e., within the next hour or less, or up to the next day.

At operation 280, a determination may be made concerning those non-solar power generators 112 that are contributing to the spinning reserve of the electrical power grid 100. For example, if an electrical power grid 100 is connected to ten gas turbines, but only eight are online, then the spinning reserve would be determined using only the excess capacity of the eight online turbines, as the two offline turbines would be considered non-spinning reserve.

At operation 285, a determination may be made concerning the spinning reserve forecast requirement for the electrical power grid 100 as previously described. Such determination may be made, for example, by forecasting a change in power demand based on historical data, known power demand behaviors, time of day, time of year, etc.

Based on one or more of the determinations made at operations 250, 260, 270, 280, and/or 285, at operation 290, a command, instruction, signal, or other control operation may be executed in order to sequence reserve non-solar power generator 112 capacity, for example, by transmitting to a local control unit an instruction to increase or decrease the power output of one or more non-solar power generators 112. Operation 295 may involve discontinuing the command, instruction, or signal, for example, in response to an indication that the command has been initiated.

In one embodiment of the disclosure, instructions such as provided at operation 290 may be initiated to adjust power generation of one or more non-solar power generators 112 based on the near term solar generation capability, and/or the non-solar power generator contributions to spinning reserve for the online electrical power grid 100, and/or the power grid spinning reserve forecast requirement. For example, if the near term solar generation capability suddenly decreases due to increased cloud cover, an instruction may be sent to a local control module to make up for the drop in solar power output by correspondingly increasing power output by one or more non-solar power generators 112 having adequate spinning reserve margin. In this regard, depending upon the spinning reserve margin available, and the amount of additional power generation needed, and depending upon the respective non-solar power generator contributions to spinning reserve, it may be necessary to increase the power generation of all of the available non-solar power generators 112, only some of them, or possibly only one of them, as conditions dictate.

An aspect of some embodiments of the disclosure is making one or more of the determinations described herein in "real time" or on a regular basis separated by relatively short intervals. For example, at operation 260, the determination of an atmospheric or environmental factor may be made daily, hourly, every 10 seconds, or even more frequently, continuously, or any other desirable interval. As another example, the contributions of each non-solar power generator 112 to spinning reserve of an electrical power grid 100 may be determined on a continuous basis, by continuously monitoring the power output of each non-solar power generator 112 as a function of available capacity for each non-solar power generator 112. As will be readily appreciated, the more frequently determinations are made in conducting the operations described herein, the more precisely and timely a control change command may be made to adjust power generation in order to most efficiently respond to current conditions, or even anticipate future conditions.

Figure 3:
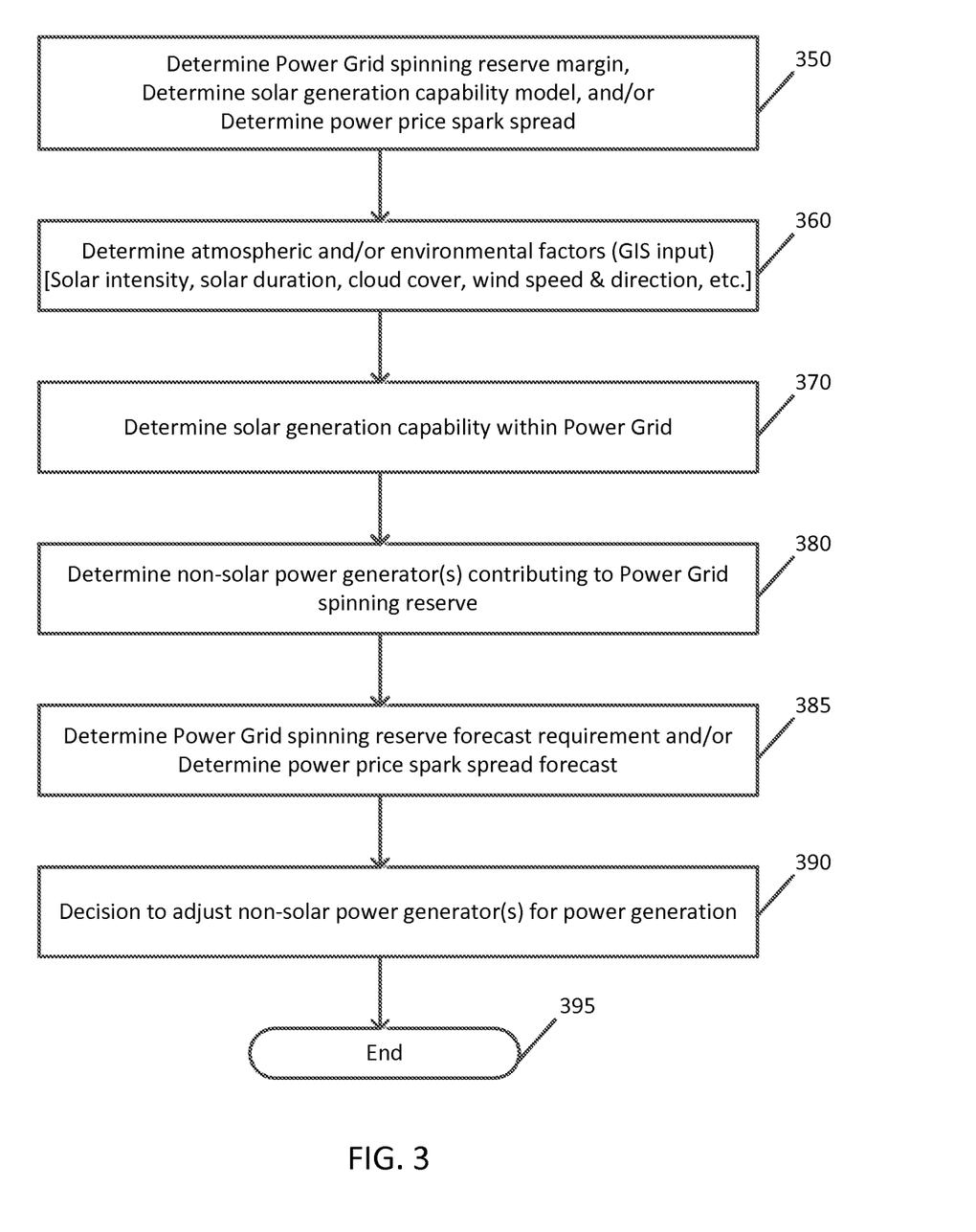
FIG. 3 is an exemplary flow diagram illustrating a method of practicing another embodiment of the disclosure.

Another aspect of the disclosure is illustrated in FIG. 3. In this aspect, there may be provided a method to improve power generation asset manager decision fidelity concerning whether or not to shut down, in advance of a drop in power price spark spread, due to an increase in the availability of a lower cost power source, such as increased solar capability. Thus, a determination of electrical power grid spinning reserve, of a solar generation capability model, and/or a power price spark spread may be performed at operation 350.

At operation 360, a determination may be made of one or more atmospheric and/or environmental factors (GIS input) as previously described. At operation 370, a determination may be made of solar generation capability within the electrical power grid 100, as previously described. At operation 380, a determination of non-solar power generator(s) 112 contributing to spinning reserve of the electrical power grid 100 may be made as previously described. At operation 385, a determination may be made of the electrical power grid 100 spinning reserve forecast requirement as previously described. Additionally, or alternatively, at operation 385 a determination may be made regarding power price spark spread forecast. As with other forecast determinations described herein, such power price spark spread forecasts may be made based on historical data, for example, data relating to increased cost of natural gas during winter months when demand may be higher. Based on one or more of these determinations, at operation 390 a decision may be made to adjust, i.e., increase, decrease, or shut down, power production of one or more non-solar power generators 112. Such adjustment may be made by sending a signal or instruction to appropriate controls for the relevant non-solar power generators 112.

Operation 390 may comprise providing instructions to adjust power generation of the one or more non-solar power generators 112 based on the near term solar generation capability of solar arrays 210 connected to the electrical power grid 100 and the power price spark spread. For example, assume that a power generation facility 110 comprises a series of non-solar power generators, such as gas turbine generators running on natural gas. If a determination is made that power price spark spread for the power generation facility 110 has decreased, or is expected to decrease, either due to an increase in fuel costs, such as natural gas prices for natural gas used to run the gas turbine power generators 112, or due to a decrease in the price which the power generation facility 110 can charge for the electricity it generates, or both, then a decision may be made to adjust the non-solar power generators 112 running on natural gas, (or any other commodity, such as steam turbines employing steam generated by boilers burning fuel oil, coal, etc.) for example by shutting one or more of such non-solar power generators 112 down and/or reducing their power generation, while replacing the power generation thus lost with increased power availability due to an increase in a secondary, less costly energy source, such as solar power available from a solar array 210 experiencing, for example, an increase in solar intensity and thus solar generation capability. Such process may be reversed, for example, when the solar array 210 experiences a loss in solar power generating capability, for example, due to increased cloud cover, at which point the spinning reserve of the non-solar power generators 112 may be relied upon by increasing power generation of running non-solar power generators or initiating startup of idle non-solar power generators 112 to make up for the lost power generating capability of the solar array 210. The process may be terminated at operation 395 upon completion of such instructions.

The above detailed description describes embodiments wherein power being generated by non-solar power generators, such as gas turbines, associated with a power generation facility 110 may be augmented with secondary power sources comprising other power generation equipment, such as solar arrays 210. It will now be appreciated that other secondary power sources, such as wind turbine farms 220 may be used in place or, or in addition to, solar arrays 210. Other combinations of secondary power sources are also possible and contemplated to be within the scope of this disclosure.

The systems, methods, determinations and operations described herein may be configured with or performed with the assistance of a processor and a memory coupled to the processor, the memory having stored thereon executable instructions that when executed by the processor cause the processor to effectuate one or more of the determinations and/or operations described herein.

This written description uses examples to disclose illustrative embodiments of the invention, including the best mode, and also to enable any person of ordinary skill in the art to practice the invention, including making and using any devices or systems and performing any incorporated methods. The operations recited in the accompanying method claims need not be taken in the recited order, where other orders of conducting the operations to achieve the desired result would be readily apparent to those of ordinary skill in the art. Similarly, not every operation set forth in the detailed description need be employed, and the recitation of some operations does not imply the exclusion of additional operations. The patentable scope of the invention is defined by the claims, and may include other examples that occur to those of ordinary skill in the art. Such other examples are intended to be within the scope of the claims if they have structural elements that do not differ from the literal language of the claims or if they include equivalent structural elements with insubstantial differences from the literal languages of the claims. As used herein, an element or function recited in the singular and proceeded with the word "a" or "an" should be understood as not excluding plural such elements or functions, unless such exclusion is explicitly recited. Furthermore, references to "one embodiment" or "an embodiment" of the claimed invention should not be interpreted as excluding the existence of additional embodiments that also incorporate the recited features.

What is claimed:
1. A method comprising:
   a. determining a spinning reserve margin for an online electric power grid served by one or more non-solar power generators;
   b. determining at least one atmospheric or environmental factor influencing solar generation capability for a region associated with the online electric power grid;
   c. determining, based on the at least one atmospheric or environmental factor, near term solar generation capability of a solar power generation system connected to the online electric power grid;
   d. determining a power grid spinning reserve forecast requirement; and
   e. providing instructions to adjust power generation of the one or more non-solar power generators based on the near term solar generation capability, the spinning reserve margin, and/or the power grid spinning reserve forecast requirement.

2. The method of claim 1 wherein the one or more non-solar power generators are selected from the group comprising gas turbine generators, steam turbine generators, battery packs, and capacitor banks.

3. The method of claim 1 wherein the at least one atmospheric or environmental factor is obtained in a region in which the solar power generation system is located or in which power generated by the solar power generation system is utilized.

4. The method of claim 3 wherein the at least one atmospheric or environmental factor is selected from the group comprising solar intensity, solar duration, cloud cover, air clarity, airborne particulate data, time of day, ambient temperature, water vapor content, and aerosol size distribution.

5. The method of claim 1 wherein if the determining, based on the at least one atmospheric or environmental factor, of the near term solar generation capability of the solar power generation system results in a determination of increased near term solar generation capability, then adjusting the power generation of the one or more non-solar power generators by decreasing the power generation of the one or more non-solar power generators, and if the determining, based on the at least one atmospheric or environmental factor, of the near term solar generation capability of the solar power generation system results in a determination of decreased near term solar generation capability, then adjusting the power generation of the one or more non-solar power generators by increasing the power generation of the one or more non-solar power generators.

6. The method of claim 1 comprising a plurality of regions, wherein each region is served by at least one solar power generation system and at least one online electric power grid, the method further comprising providing instructions to simultaneously adjust one or more non-solar power generators in each region based on the near term solar generation capability and the power grid spinning forecast requirement for each region.

7. The method of claim 1 wherein providing instructions comprises transmitting a signal to the one or more non-solar power generators.

8. The method of claim 7 wherein the signal comprises a wireless transmission.

9. The method of claim 1 wherein determining the power grid spinning reserve forecast requirement comprises determining a change in power consumption demand based on historical power consumption patterns.

10. The method of claim 1, further comprising determining power generator contributions to spinning reserve for the online electric power grid, and providing instructions to adjust power generation of the one or more non-solar power generators based on the near term solar generation capability, the non-solar power generator contributions to spinning reserve for the online electric power grid, and the power grid spinning reserve forecast requirement.

11. An electric power system comprising an electric power grid comprising one or more non-solar power generators;
the electric power grid configured to determine a spinning reserve margin for the one or more non-solar power generators;
the electric power grid further configured to determine at least one atmospheric or environmental factor influencing solar generation capability for a region associated with the electric power grid;
the electric power grid further configured to determine, based on the at least one atmospheric or environmental factor, near term solar generation capability of a solar power generation system connected to the electric power grid;
the electric power grid further configured to determine a power grid spinning reserve forecast requirement;
the electric power grid further configured to receive, initiate, and/or transmit instructions to adjust power generation of the one or more non-solar power generators based on the near term solar generation capability and the power grid spinning reserve forecast requirement.

12. The electric power system of claim 11, further configured to determine non-solar power generator contributions to spinning reserve for the electric power grid, and further configured to provide instructions to adjust power generation of the one or more non-solar power generators based on the near term solar generation capability, the non-solar power generator contributions to the spinning reserve for the power grid, and the power grid spinning reserve forecast requirement.

13. The electric power system of claim 11, wherein the one or more non-solar power generators are selected from the group comprising gas turbine generators, steam turbine generators, battery packs, and capacitor banks.

14. The electric power system of claim 11, wherein the electric power system is further configured to obtain the at least one atmospheric or environmental factor from a region in which the solar power generation system is located, or in which power generated by the solar power generation system is utilized.

15. The electric power system of claim 11, wherein the at least one atmospheric or environmental factor is selected from the group comprising solar intensity, solar duration, cloud cover, air clarity, airborne particulate data, time of day, ambient temperature, water vapor content, and aerosol size distribution.

16. The electric power system of claim 11, wherein the system is further configured to adjust the power generation of the one or more non-solar power generators by decreasing that power generation in response to a determination of increased near term solar generation capability, and wherein the electric power system is further configured to adjust the power generation of the one or more non-solar power generators by increasing that power generation in response to a determination of decreased near term solar generation capability.

17. The electric power system of claim 11, the electric power system serving a plurality of regions, wherein each region is served by at least one solar power generation system and at least one electric power grid, the electric power system further configured to simultaneously adjust one or more non-solar power generators in each region based on the near term solar generation capability and the power grid spinning reserve forecast requirement for each region.

18. The electric power system of claim 11, wherein the instructions to adjust power generation of the one or more non-solar power generators based on the near term solar generation capability and the power grid spinning reserve forecast requirement comprise a signal.

19. The electric power system of claim 11, the electric power system further configured to determine the power grid spinning reserve forecast requirement by determining a change in power consumption demand based on historical power consumption data.

20. A method comprising:
a. determining a power price spark spread for power being produced by one or more non-solar power generators associated with an electric power grid;
b. determining near term solar generation capability of a solar power generation system connected to the online electric power grid; and
c. determining, based on the power price spark spread and the near term solar generation capability, whether to adjust power generation of the one or more non-solar power generators.

* * * * *